Nov. 14, 1933.   J. H. KAUFFMAN   1,935,295
IRRIGATION DEVICE
Filed Oct. 24, 1932   2 Sheets-Sheet 1

Nov. 14, 1933.  J. H. KAUFFMAN  1,935,295
IRRIGATION DEVICE
Filed Oct. 24, 1932  2 Sheets-Sheet 2
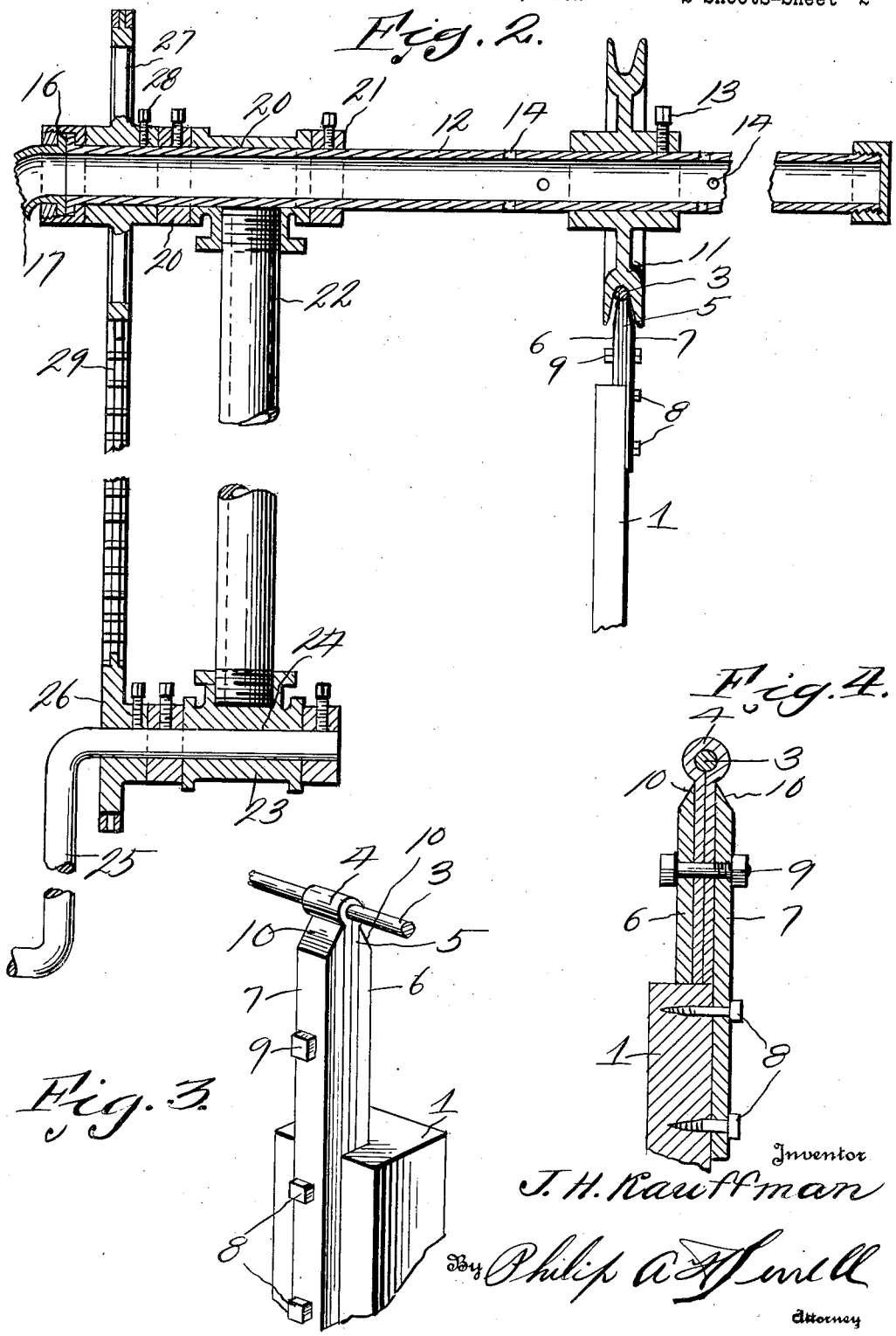

Patented Nov. 14, 1933

1,935,295

UNITED STATES PATENT OFFICE 1,935,295

IRRIGATION DEVICE

John H. Kauffman, Eustis, Fla.

Application October 24, 1932. Serial No. 639,373

3 Claims. (Cl. 299—47)

The invention relates to irrigation devices and has for its object to provide a device of this character wherein a transversely extending perforated pipe is traversed on supporting tracks above a field, and provided with a flexible pipe connection to a source of liquid supply to be sprayed or distributed over the field, and to provide said pipe with grooved wheels, rigidly mounted thereon and rotatable therewith, and a hand operated mechanism extending downwardly from the perforated pipe, and adapted to be grasped and operated by the operator for rotating the pipe and advancing the same over the field, and on the tracks.

A further object is to provide an irrigating device comprising a rotatable perforated distributor pipe having wheels mounted on trackways above a field and having a flexible connection with a source of liquid supply with a rotating mechanism comprising a sprocket wheel carried by the pipe, and rotatable therewith, a pivoted downwardly extending arm carried by the pipe adjacent the sprocket wheel, and terminating at its lower end in a crank having a sprocket wheel and sprocket chain connection with the sprocket wheel carried by the perforated pipe.

A further object is to provide a valve adjacent one end of the perforated pipe whereby the amount of fluid allowed to pass through the perforated pipe may be regulated.

A further object is to mount the device on spaced wires carried by uprights, and to clamp the wires in clamping devices carried by the uprights in a manner whereby the grooved wheels may pass thereover.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 2 is a vertical longitudinal sectional view through one side of the device, taken on line 2—2 of Figure 1.

Figure 3 is a perspective view of the upper end of one of the posts showing one of the wire clamping devices.

Figure 4 is a vertical transverse sectional view through one of the clamping devices.

Figure 1:
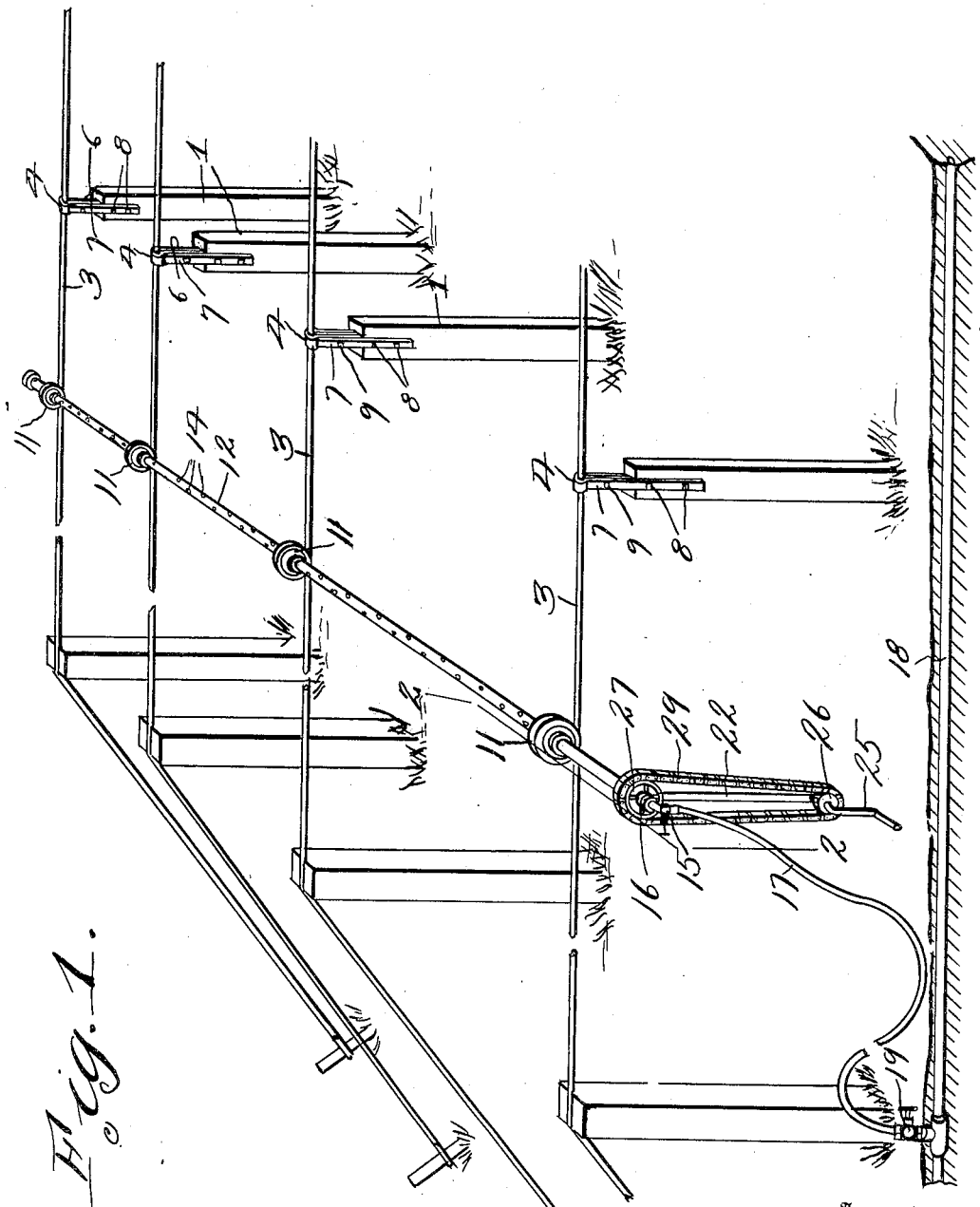
Figure 1 is a perspective view of the irrigating device.

Referring to the drawings, the numeral 1 designates a plurality of supporting posts adapted to be disposed in a field to be irrigated. The posts may be spaced at various distances apart, however they are preferably placed in rows in parallel relation, as clearly shown in Figure 1, for supporting the trolley wires 3 in horizontal parallel relation, and on which wires the irrigating device, hereinafter set forth is mounted and is adapted to be traversed to different positions to irrigate the field 2. Wires 3 are clamped in the loops 4 of the straps 5 bent upon themselves as clearly shown in Figures 3 and 4, and which straps are securely clamped between the plates 6 and 7 of the clamping devices, carried by the upper ends of the posts 1. Plates 7 are secured to the posts 1 by means of bolts 8 and bolts 9 extend through the plates 6 and 7 and the straps for holding these parts securely clamped together. The upper ends of the plates 6 and 7 are bevelled as shown at 10 so that the supporting grooved wheels 11 may easily pass over the looped portions 4 of the clamps without interference from the plates 6 and 7. Grooved pulleys 11 are securely clamped and held on the perforated irrigated pipe 12 which extends transversely across the trolley wires 3 by means of a set screw 13, and any number of pulleys 11 may be used, as applicant does not limit himself in this respect, nor does he limit himself as to the length of the perforated pipe 12, or the number or arrangement of the perforations 14 therein.

One end of the perforated pipe is provided with a valve 15, by means of which the amount of fluid allowed to pass through the perforated pipe 12 may be regulated. Connected, preferably by a swivel connection at 16, to one end of the perforated pipe, is a flexible pipe 17, which may be of any length and which leads to a liquid supply pipe 18, which is preferably embedded in the ground, however applicant does not limit himself in this particular. Valve 19 is provided for cutting off the flow of water from the main supply pipe 18 through the flexible pipe 17. Valve 15 is preferably utilized for manipulation by the operator for regulating the flow of water. Pivotally mounted at 20 on the perforated pipe 12 and between the collars 21 is a downwardly extending arm 22, the lower end of which terminates in a horizontal bearing member 23, in which is rotatably mounted the shaft 24 of the crank 25 adapted to be grasped by the operator while manipulating the device. Shaft 24 is horizontally disposed and has mounted on one end thereof a sprocket 26, and extending around said sprocket, and over a sprocket 27, secured to the perforated pipe 12 by a set screw 28, is an endless sprocket chain 29. It will be seen that the operator, when he desires to traverse the perforated irrigating pipe 12 over the field 2, grasps the downwardly extending arm 22 with one hand adjacent its lower end and the crank 25 with the other hand. Upon rotation of the crank shaft 24, rotation is imparted to the perforated crank 12 through the medium of the sprockets 27 and the sprocket chain 29, and as the grooved wheels 11 are rigidly attached to the perforated pipe 12, and rotates therewith the irrigating pipe will be advanced.

Although the device is described in connection with water distribution for irrigation purposes and sprinkling purposes, it is to be understood applicant may mix an insecticide with the water or a fertilizing element with the water if desired.

From the above it will be seen that an irrigating device is provided which is simple in construction, the parts reduced to a minimum and one constructed in a manner whereby it may be easily operated by a single operator for irrigating and sprinkling a relatively large area.

Modified wheels may be used if desired and the device mounted on the ground instead of on wire or a rigid trackway. By grooving the wheels 11, wedgeshaped in cross section, sufficient friction is provided for the wires for preventing slippage on inclines.

The invention having been set forth what is claimed as new and useful is:

1. An irrigating device comprising a plurality of trackways disposed above a field, a wheel supported perforated spraying pipe mounted on said trackways, means for supplying fluid to said perforated pipe, a dependent arm pivoted on the pipe, a crank carried by the lower end of said dependent arm and driving connections between said crank and the perforated pipe forming means whereby said pipe and the supporting wheels may be rotated for advancing the pipe on the trackways in either direction.

2. The combination with a wheel supported spraying pipe rotatably mounted on trackways above a field, a flexible water supply pipe connected to said wheel supported spraying pipe, a downwardly extending arm, in a bearing of which the wheel supported spraying pipe is rotatably mounted, an operating crank carried by said downwardly extending arm, a sprocket carried by the operating crank, a sprocket carried by the spraying pipe and a sprocket chain extending around said sprockets.

3. A sprinkling and irrigating device comprising a spraying pipe rotatably mounted on tracks above a field and adapted to be advanced on said tracks by rotation thereof, means for rotating said pipe, said means comprising a downwardly extending rigid arm, an operating crank carried by said arm, driving connections between said operating crank and pipe for rotating the pipe, said arm being pivotally mounted on the pipe, a flexible pipe connected to the spraying pipe pivotally, said flexible pipe leading to a source of fluid supply.

JOHN H. KAUFFMAN.